(12) United States Patent
Tobita et al.

(10) Patent No.: US 7,910,643 B2
(45) Date of Patent: Mar. 22, 2011

(54) POLYLACTIC ACID RESIN COMPOSITION, MOLDINGS, AND PROCESS FOR PRODUCTION THEREOF

(75) Inventors: Etsuo Tobita, Saitama (JP); Naoshi Kawamoto, Saitama (JP); Tsuyoshi Urushihara, Saitama (JP); Hitoshi Saito, Saitama (JP); Hisashi Okuyama, Toyota (JP); Naomi Okuyama, legal representative, Kyoto (JP); Takeshi Kanamori, Toyota (JP); Mitsuru Nakano, Aichi (JP); Hirotaka Okamoto, Aichi (JP)

(73) Assignee: Adeka Corporation, Tokyo (JP)

( * ) Notice: Subject to any disclaimer, the term of this patent is extended or adjusted under 35 U.S.C. 154(b) by 1054 days.

(21) Appl. No.: 11/661,671

(22) PCT Filed: Sep. 2, 2005

(86) PCT No.: PCT/JP2005/016092
§ 371 (c)(1),
(2), (4) Date: Mar. 2, 2007

(87) PCT Pub. No.: WO2006/025520
PCT Pub. Date: Mar. 9, 2006

(65) Prior Publication Data
US 2010/0174017 A1    Jul. 8, 2010

(30) Foreign Application Priority Data
Sep. 3, 2004  (JP) .................. 2004-256508

(51) Int. Cl.
*C08K 5/24* (2006.01)
*C08G 63/08* (2006.01)

(52) U.S. Cl. .......... 524/192; 524/556; 528/354

(58) Field of Classification Search ............ 524/192, 524/556; 528/354, 503
See application file for complete search history.

(56) References Cited

U.S. PATENT DOCUMENTS

| 5,180,765 | A | 1/1993 | Sinclair |
| 5,180,795 | A | 1/1993 | Gerber |
| 2005/0001358 | A1 | 1/2005 | Nakazawa et al. |

FOREIGN PATENT DOCUMENTS

| EP | 1 449 864 | | 8/2004 |
| JP | 60-86156 | | 5/1985 |
| JP | 4-220456 | | 8/1992 |
| JP | 46-7088 A | * | 8/1992 |
| JP | 5-70696 | | 3/1993 |
| JP | 50-067781 A | * | 3/1993 |
| JP | 50-070696 A | * | 3/1993 |
| JP | 6-504799 | | 6/1994 |
| JP | 7-504939 | | 6/1995 |
| JP | 8-193165 | | 7/1996 |
| JP | 9-124778 | | 5/1997 |
| JP | 09124778 A | * | 5/1997 |
| JP | 9-278991 | | 10/1997 |
| JP | 10-87975 | | 4/1998 |
| JP | 11-5849 | | 1/1999 |
| WO | WO 90/01521 | | 2/1990 |
| WO | 03/006525 | | 1/2003 |
| WO | WO 03/057781 | | 7/2003 |

OTHER PUBLICATIONS

Japanese Patent Office issued a Japanese Office Action dated Apr. 27, 2010, Application No. 2004-256508.
European Search Report—05776983—Jul. 22, 2010.

* cited by examiner

*Primary Examiner* — David Wu
*Assistant Examiner* — Michael M Bernshteyn
(74) *Attorney, Agent, or Firm* — Young & Thompson

(57) ABSTRACT

A polylactic acid resin composition in which polylactic acid is blended with dibasic acid bis(benzoylhydrazide) represented by general formula (I) below; and a process for producing heat-resistant polylactic acid resin moldings, wherein after the polylactic acid resin composition is melted, the polylactic acid resin composition melted is filled in a die of a molding machine and molded accompanied with crystallization, in which the temperature of the die has been set in a range not higher than the initiation temperature of crystallization and not lower than the glass transition temperature determined with a differential scanning calorimeter (DSC).

[Formula 1]

$$R^1\text{-}Ar\text{-}\underset{\underset{O}{\|}}{C}\text{-}\underset{\underset{H}{|}}{N}\text{-}\underset{\underset{H}{|}}{N}\text{-}\underset{\underset{O}{\|}}{C}\text{-}R\text{-}\underset{\underset{O}{\|}}{C}\text{-}\underset{\underset{H}{|}}{N}\text{-}\underset{\underset{H}{|}}{N}\text{-}\underset{\underset{O}{\|}}{C}\text{-}Ar\text{-}R^3 \quad (I)$$

(with $R^2$ and $R^4$ substituents on the aryl rings)

(In the formula, R represents a alkylene, alkenylene, cycloalkylene, alkylene having an ether bond, or alkylene interrupted with a cycloalkylene, the groups each having 1 to 12 carbon atoms; and $R^1$, $R^2$, $R^3$, and $R^4$ each represent a hydrogen atom, halogen atom, alkyl, cycloalkyl, aryl, aralkyl, or alkylaryl, the groups each having 1 to 12 carbon atoms, or $R^1$ and $R^2$ and/or $R^3$ and $R^4$ bond to each other to form a five- to eight-membered ring.)

17 Claims, No Drawings

POLYLACTIC ACID RESIN COMPOSITION, MOLDINGS, AND PROCESS FOR PRODUCTION THEREOF

TECHNICAL FIELD

The present invention relates to a polylactic acid resin composition capable of forming, in good moldability, moldings with excellent mechanical properties and heat resistance; heat-resistant polylactic acid resin moldings obtained from the polylactic acid resin composition; and a process for producing heat-resistant polylactic acid resin moldings.

BACKGROUND ART

From a viewpoint of natural environmental conservation, there has recently been demand for biodegradable polymers decomposable in natural environment and moldings formed from biodegradable polymers, and biodegradable polymers such as aliphatic polyesters are actively studied. Particularly, lactic acid-based polymers have substantially high melting points ranging from 140 to 180° C. and excellent transparency, and hence much expectations are placed on these polymers as packaging materials and for moldings benefited from their transparency.

However, among containers obtained from lactic acid-based polymers by injection molding or the like, some have excellent mechanical properties but low heat resistance, and some are poor in both heat resistance and mechanical properties. When such containers are used as packaging containers, for example, hot water or microwave cannot be applied and hence their use is limited.

In order to obtain heat-resistant moldings, it has been required to highly crystallize the resin by prolonging die-cooling time during molding process or by annealing the moldings after molding. However, these methods have drawbacks: the prolonged cooling in molding process is impractical and likely to cause insufficient crystallization, while the crystallization by annealing after molding readily deforms the moldings during the crystallization.

As a method to increase crystallization rates of resins, for example, Patent Document 1 describes a method of adding fine powder of a wholly aromatic polyester mainly composed of terephthalic acid unit and resorcinol unit as a nucleating agent for promoting crystallization of polyethylene terephthalate (PET). Such addition of a nucleating agent is generally known as a method to accelerate crystallization of resins.

Patent Documents 2 to 10 describe addition of additives such as nucleating agents to biodegradable polymers.

Patent Document 2 discloses materials for plastic containers in which 10 to 40% by weight of calcium carbonate or talc with an average particle diameter of 20 μm or less is mixed with biodegradable plastics such as 3-hydroxybutyrate/3-hydroxyvalerate copolymer, polycaprolactone, or polylactic acid. In this technique, however, a large amount of inorganic filler was added to accelerate degradation of the biodegradable plastics discarded, not to improve heat resistance of the moldings through crystallization of the biodegradable polymers.

Patent Document 3 describes addition of an inorganic compound such as silica or kaolinite as a filler to thermoplastic lactide plastics can modify the properties in hardness, strength, and temperature resistance. According to Example therein, when 5% by weight of calcium lactate was added as a nucleating agent to L-/DL-lactide copolymer and the mixture was blended by a heating roll at 170° C. for 5 minutes to form a sheet, the sheet was excellent in rigidity and strength and exhibited cloudiness indicative of increase in crystallinity.

Patent Document 4 describes lactic acid or lactic acid oligomers are useful as a plasticizer of polylactic acid to lower the glass transition temperature and to impart flexibility.

Patent Document 5 describes lactate salts and benzoate salts as nucleating agents to blend in a biodegradable composition containing polylactic acid. According to Examples therein, when 1% of calcium lactate was blended with a polylactide copolymer and the blend was injection-molded with a die kept at about 85° C. for a retention time of 2 minutes, the resultant molding had insufficient crystallinity and hence it was further annealed in a die at about 110 to about 135° C.

According to Patent Document 6, however, a lactic acid-based polymer was indeed blended with a conventional nucleating agent, such as talc, silica, and calcium lactate, and it was tried being injection-molded, but crystallization was slow and the molding was brittle, providing no moldings durable in practical use. The document describes, therefore, that the lactic acid-based polymer has limitation on its use because, even if it is blended with conventional talc, silica, calcium lactate, or the like and molded by a common process such as injection molding, blow molding, and compression molding, the crystallization is slow, and resultant moldings have a service heat resistance as low as 100° C. or lower and unsatisfactory impact resistance.

Patent Document 7 describes that, when polyglycolic acid and/or derivatives thereof was added to poly-L-lactide or others as a nucleating agent, the crystallization rate increased, the cycling time in injection molding was, therefore, shortened, and moldings with excellent mechanical properties were obtained. Furthermore, the document describes that in injection molding, the values of crystallinity at a cooling time of 60 seconds was 22.6% with no nucleating agent added and 45.5% with the nucleating agent added. Patent Document 6, however, describes that when injection molding of the lactic acid-based polymer was indeed tried without any nucleating agent, molding was failed under conditions where the die temperature was not lower than the glass transition temperature as described in Patent Document 7.

Patent Document 8 proposes addition of stabilizers to a polylactide mixture in an amount effective for reducing the ratio of depolymerization at temperatures not lower than the glass transition temperature, wherein the stabilizers include antioxidants, dehydrating agents, drying agents, and catalyst deactivators. The catalyst deactivators listed there include alkylhydrazines, arylhydrazines, amides, cyclic amides, hydrazones, acylhydrazides, diacylated hydrazine derivatives, and heterocyclic compounds, among which, bis[3-(3, 5-di-tert-butyl-4-hydroxyphenyl)propionyl]hydrazide is listed as a preferred catalyst deactivator. Addition of bis[3-(3, 5-di-tert-butyl-4-hydroxyphenyl) propionyl]hydrazide was able to suppress depolymerization in a molten state, but not able to provide any resin composition that was excellent in crystallinity and transparency and capable to be processed with a molding cycle similar to that for common resins. That is, the deactivation of catalyst did not contribute to improving the molding cycle.

Patent Documents 9 to 11 describe the mixing polylactic acid or aliphatic polyesters with an aromatic or aliphatic carboxamide provided moldings with excellent crystallinity, transparency, and heat resistance. However, in practical processes including injection molding, such composition cannot be molded with a molding cycle similar to that for common resins, and hence its practical application is difficult.

Patent Document 1: Japanese Patent Laid-Open Publication No. S60-86156
Patent Document 2: Japanese Patent Laid-Open Publication No. H5-70696
Patent Document 3: Japanese Patent Application Laid-Open No. H5-504731 (WO 90/001521 pamphlet)
Patent Document 4: U.S. Pat. No. 5,180,765
Patent Document 5: Japanese Patent Application Laid-Open No. H6-504799
Patent Document 6: Japanese Patent Laid-Open Publication No. H8-193165
Patent Document 7: Japanese Patent Laid-Open Publication No. H4-220456
Patent Document 8: Japanese Patent Application Laid-Open No. H7-504939
Patent Document 9: Japanese Patent Laid-Open Publication No. H9-278991
Patent Document 10: Japanese Patent Laid-Open Publication No. H10-87975
Patent Document 11: Japanese Patent Laid-Open Publication No. H11-5849

DISCLOSURE OF THE INVENTION

Problems to be Solved by the Invention

For solving the above problems in conventional arts, the present invention has an object to provide a polylactic acid resin composition capable of providing moldings excellent in heat resistance and impact strength with good moldability; heat-resistant polylactic acid resin moldings formed from the polylactic acid resin composition; and a process for producing the heat-resistant resin polylactic acid moldings.

Means to Solve the Problems

The present invention achieves the above object by providing a polylactic acid resin composition wherein polylactic acid is blended with a dibasic acid bis(benzoylhydrazide) represented by general formula (I) below, preferably a polylactic acid resin composition wherein 100 parts by weight of polylactic acid are blended with 0.01 to 10 parts by weight of the compound represented by general formula (I) below.

[Formula 1]

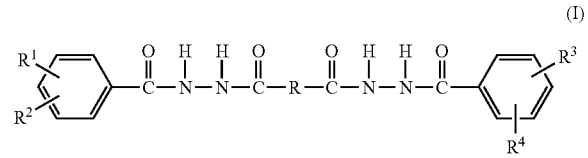

(I)

(In the formula, R represents a alkylene, alkenylene, cycloalkylene, alkylene having an ether bond, or alkylene interrupted with a cycloalkylene, the groups each having 1 to 12 carbon atoms; and $R^1$, $R^2$, $R^3$, and $R^4$ each represent a hydrogen atom, halogen atom, alkyl, cycloalkyl, aryl, aralkyl, or alkylaryl, the groups each having 1 to 12 carbon atoms, or $R^1$ and $R^2$ and/or $R^3$ and $R^4$ bond to each other to form a five- to eight-membered ring.)

The present invention also achieves the above object by providing the above polylactic acid resin composition wherein R in general formula (I) is a $C_{4-10}$ alkylene.

The present invention also achieves the above object by providing the above polylactic acid resin composition wherein each of $R^1$, $R^2$, $R^3$, and $R^4$ in general formula (I) is a hydrogen atom.

The present invention also achieves the above object by providing the above polylactic acid resin composition wherein R is a $C_{6-10}$ alkylene and each of $R^1$, $R^2$, $R^3$, and $R^4$ is a hydrogen atom in general formula (I).

The present invention also achieves the above object by providing the above polylactic acid resin composition blended with 0.01 to 40 parts by weight of hydrated magnesium silicate (talc).

The present invention also achieves the above object by providing the above polylactic acid resin composition wherein the above hydrated magnesium silicate (talc) has an average particle diameter of 10 μm or less.

The present invention also achieves the above object by providing a heat-resistant polylactic acid resin molding obtained by molding the above polylactic acid resin composition.

The present invention also achieves the above object by providing a process for producing heat-resistant polylactic acid resin moldings, in which the above polylactic acid resin composition is melted, and then the polylactic acid resin composition melted is filled in a die of a molding machine and molded accompanied with crystallization, wherein the temperature of the die has been set in a range not higher than the initiation temperature of crystallization and not lower than the glass transition temperature, the temperatures being determined with a differential scanning calorimeter (DSC).

BEST MODE FOR CARRYING OUT THE INVENTION

The polylactic acid resin composition of the present invention is described in detail below.

The polylactic acid (lactic acid-based polymer) used in the polylactic acid resin composition of the present invention includes, for example, a polylactic acid homopolymer, a polylactic acid copolymer, and a blend polymer of a polylactic acid homopolymer and a polylactic acid copolymer. A blend polymer containing polylactic acid as a major component may be also used so far as crystallinity, which is characteristic of the polylactic acid resin composition of the present invention, is not impaired.

The weight-average molecular weight (Mw) of the polylactic acid is, in terms of polystyrene determined with gel permeation chromatography, generally 50,000 to 500,000, and preferably 100,000 to 250,000. When the weight-average molecular weight is less than 50,000, properties required for practical use are difficult to obtain, whereas a weight-average molecular weight over 500,000 tends to cause poor moldability.

In the polylactic acid, the molar constituent ratio of L-lactic acid unit to D-lactic acid unit (L/D) may be selected from a range of 100/0 to 0/100 without particular limitations. In order to obtain a polylactic acid resin composition with a high melting point, however, the polylactic acid preferably contains either L-lactic acid unit or D-lactic acid unit in a ratio of 75 mol % or more, and in order to obtain a polylactic acid resin composition with a still higher melting point, it preferably contains either L-lactic acid unit or D-lactic acid unit in a ratio of 90 mol % or more.

The above polylactic acid copolymer is a polymer formed by copolymerization of lactic acid monomer or lactide with (an)other component(s) copolymerizable therewith. Such other components include compounds having two or more functional groups capable of forming an ester bond such as dicarboxylic acids, polyols, hydroxycarboxylic acids, lactones, and others; and polymers whose constituents are derived from these compounds such as polyesters, polyethers, polycarbonates, and others.

The dicarboxylic acids include succinic acid, adipic acid, azelaic acid sebacic acid, terephthalic acid, isophthalic acid, and others.

The above polyols include aromatic polyols such as ethylene oxide-adducts of bisphenol; aliphatic polyols such as ethylene glycol, propylene glycol, butanediol, hexanediol, octanediol, glycerol, sorbitol, trimethylolpropane, and neopentyl glycol; ether glycols such as diethylene glycol, triethylene glycol, polyethylene glycol, and polypropylene glycol; and others.

The above hydroxycarboxylic acids include glycolic acid, hydroxybutyric acid, hydroxycarboxylic acids described in Japanese Patent Laid-Open Publication No. H6-184417, and others.

The above lactones include glycolide, ε-caprolactone glycolide, ε-caprolactone, ε-propiolactone, δ-butyrolactone, β-butyrolactone, γ-butyrolactone, pivalolactone, δ-valerolactone, and others.

The polylactic acid used in the polylactic acid resin composition of the present invention is not particularly limited on synthetic method thereof and may be synthesized by conventionally known methods. For example, the polylactic acid may be synthesized by a direct dehydrative condensation of lactic acid monomer described in Japanese Patent Laid-Open Publication No. H7-33861, Japanese Patent Laid-Open Publication No. S59-96123, Preprint of Polymer Symposium, vol. 44, pp. 3198-3199, or others; or a ring-opening polymerization of cyclic dimer of lactic acid, that is, lactide.

In the direct dehydration condensation, any lactic acid among L-lactic acid, D-lactic acid, DL-lactic acid, and a mixture thereof may be used. In the ring-opening polymerization, any lactide among L-lactide, D-lactide, DL-lactide, meso-lactide, and a mixture thereof may be used.

Procedures of synthesis, purification, and polymerization of lactide used in the ring-opening polymerization are described in U.S. Pat. No. 4,057,537, EP Application No. 261572, Polymer Bulletin, 14, 491-495 (1985), Macromol. Chem., 187, 1611-1628 (1986), and others.

Catalysts used in polymerization to obtain the polylactic acid are not particularly limited to, but include publicly known catalysts for polymerization of lactic acid. Said catalysts include, for example, tin compounds such as tin lactate, tin tartarate, tin dicaprylate, tin dilaurate, tin dipalmitate, tin distearate, tin dioleate, tin α-naphthoate, tin β-naphthoate, and tin octanoate, tin powder, tin oxide, zinc powder, zinc halide, zinc oxide, organozinc compounds, titanium compounds such as tetrapropyl titanate, zirconium compounds such as zirconium isopropoxide, antimony compounds such as antimony trioxide, bismuth compounds such as bismuth (III) oxide, aluminum compounds such as aluminum oxide and aluminum isopropoxide, and others.

Among them, catalysts comprising tin or tin compounds are particularly preferred in terms of the activity. The catalyst is used, for example, in an amount of about 0.001 to about 5% by weight of lactide in ring-opening polymerization.

The polymerization can be conducted in the presence of the catalyst generally at 100 to 220° C., depending on the type of catalyst. Two-step polymerization is also preferred, which is described, for example, in Japanese Patent Laid-Open Publication No. H7-247345.

The above blend polymer containing polylactic acid as a major component is, for example, a mixture obtained by mixing and melting of polylactic acid homopolymer and/or polylactic acid copolymer with an aliphatic polyester other than polylactic acid (simply called "aliphatic polyester" hereinafter). Blending the aliphatic polyester is preferred because flexibility and impact resistance are imparted to moldings. The blending ratio in the blend polymer is generally about 10 to about 100 parts by weight of the aliphatic polyester to 100 parts by weight of polylactic acid homopolymer and/or polylactic acid copolymer.

The aliphatic polyester may be one kind of one polymer or a combination of two or more polymers. The polymer includes, for example, a polymer formed from an aliphatic carboxylic acid and an aliphatic alcohol, a poly(aliphatic hydroxycarboxylic acid) obtained by ring-opening polymerization of the corresponding cyclic dehydrated form such as s-caprolactone, and others. Methods to obtain such polymers include a direct polymerization method, in which a high-molecular-weight product is obtained by direct polymerization, an indirect polymerization method in which (a) monomer(s) is(are) polymerized to an oligomeric intermediate followed by subsequent reaction to obtain a high-molecular-weight product using a chain extender or the like, and others.

The aliphatic polyester may be a copolymer so far as it is a polymer whose major constituents are derived from the above aliphatic monomer components, or the aliphatic polyester may be a mixture with (an)other resin(s).

The aliphatic polyester is preferably a polymer formed from an aliphatic dicarboxylic acid and an aliphatic diol. The aliphatic dicarboxylic acid includes, for example, succinic acid, adipic acid, suberic acid, sebacic acid, decanoic acid, and anhydrides or derivatives thereof. The aliphatic diol includes, for example, glycol-type compounds such as ethylene glycol, butanediol, hexanediol, octanediol, cyclohexanedimethanol, and derivatives thereof. Any of the aliphatic dicarboxylic acid and the aliphatic diol is preferably a monomer which has alkylene, cyclic group, or cycloalkylene having 2 to 10 carbon atoms. The aliphatic polyester is preferably produced by polycondensation of monomer components each selected from such aliphatic dicarboxylic acids or from such aliphatic diols. Two or more monomers may be used as the aliphatic dicarboxylic acid and/or the aliphatic diol.

For the purpose of creating branches in the polymer to be used as the aliphatic polyester for increasing the melt viscosity, a trifunctional or higher functional carboxylic acid, alcohol, or hydroxycarboxylic acid may be used as a monomer component constituting the polymer. If such polyfunctional monomer component is used in a large amount, a polymer with a crosslinked structure may be generated, and such a polymer may not be thermoplastic or, even if thermoplastic, may form microgel having in part a highly crosslinked structure. Therefore, such a polyfunctional monomer component is used in such an amount that the content of constitutional units derived therefrom in the polymer is low enough to avoid loss of thermoplasticity of the polymer, drastic reduction in impact strength of the polymer, and significant effects on the chemical properties. As the polyfunctional monomer component, there may be used malic acid, tartaric acid, citric acid, trimellitic acid, pyromellitic acid, pentaerythritol, trimethylolpropane, or others.

Among methods for producing the polymer used as the aliphatic polyesters, the direct polymerization method is a method in which monomer component are selected and polymerized, with removal of water present in the monomers or generated during the polymerization, to yield a high-molecular-weight product. The indirect polymerization method is a method in which monomer components are selected and polymerized to an oligomeric intermediate, which is further polymerized to increase the molecular weight using a small amount of a chain extender, for example, a diisocyanate such as hexamethylene diisocyanate, isophorone diisocyanate, xylylene diisocyanate, or diphenylmethane diisocyanate. In addition to such methods, there may be used a method of using a carbonate compound to obtain an aliphatic polyester-carbonate.

In the polylactic resin composition of the present invention, the polylactic acid may be blended with a common resin other than polylactic acid if needed for improving impact strength or other purposes. The common resin is preferably an elastic resin such as ethylene/propylene copolymer rubber and ethylene/propylene/diene copolymer.

In the polylactic acid composition of the present invention, the compound represented by general formula (I) is blended with the above-mentioned polylactic acid as a nucleating agent. The compound represented by general formula (I) has a structure of a reaction product between a dibasic acid, hydrazine, and an aromatic acid.

The $C_{1-12}$ alkylene represented by R in general formula (I) includes methylene, ethylene, trimethylene, propylene, tetramethylene, pentamethylene, 2,2-dimethyltripropylene, hexamethylene, octamethylene, decamethylene, dodecamethylene, and others. The cycloalkylene includes 1,4-cyclohexylene, 1,3-cyclohexylene, 1,2-cyclohexylene, 1,1-cyclohexylidene, and others. The ether bond-containing alkylene includes a divalent group derived from diethyl ether, dipropyl ether, dibutyl ether, or others. The alkylene interrupted with a cycloalkylene includes a divalent group derived from methylcyclohexylmethyl and others. A compound wherein R is a $C_{4-10}$ alkylene is preferred because the polylactic acid composition obtained has a large heat of crystallization and a high crystallization temperature. A compound wherein R is a $C_{6-10}$ alkylene is particularly preferred.

The $C_{1-12}$ alkyl represented by $R^1$, $R^2$, $R^3$, or $R^4$ in general formula (I) includes, for example, methyl, ethyl, propyl, isopropyl, butyl, sec-butyl, tert-butyl, pentyl, tert-pentyl, hexyl, heptyl, octyl, isooctyl, tert-octyl, 2-ethylhexyl, nonyl, isononyl, decyl, isodecyl, undecyl, dodecyl, and others. The cycloalkyl includes, for example, cyclopentyl, cyclohexyl, cycloheptyl, and others. $R^1$, $R^2$, $R^3$, and $R^4$ are each preferably a hydrogen atom or a $C_{1-4}$ alkyl, and particularly preferably a hydrogen atom, because the polylactic acid composition obtained has a large heat of crystallization and a high crystallization temperature.

The aryl represented by $R^1$, $R^2$, $R^3$, or $R^4$ in general formula (I) includes, for example, phenyl, biphenyl, naphthyl, and others. The aralkyl includes benzyl, phenethyl, and others. The alkylaryl includes methylphenyl, ethylphenyl, propylphenyl, isopropylphenyl, butylphenyl, tert-butylphenyl, and others.

The halogen atom represented by $R^1$, $R^2$, $R^3$, or $R^4$ in general formula (I) includes fluorine, chlorine, bromine, and others.

When $R^1$ and $R^2$ and/or $R^3$ and $R^4$ in above formula (I) are linked to form a ring system, the ring is condensed with the benzene ring to which $R^1$ and $R^2$ bond or the benzene ring to which $R^3$ and $R^4$ bond, thereby forming, for example, a naphthalene ring.

The compound represented by general formula (I) includes, more specifically, compounds No. 1 to 12 below and others. However, the present invention is not limited at all by the compounds below.

[Formula 2]

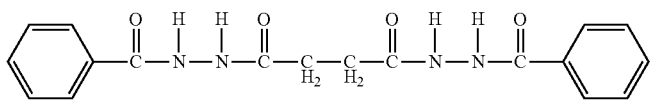

Compound No. 1

[Formula 3]

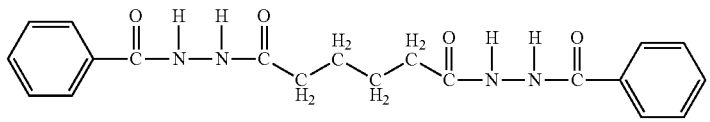

Compound No. 2

[Formula 4]

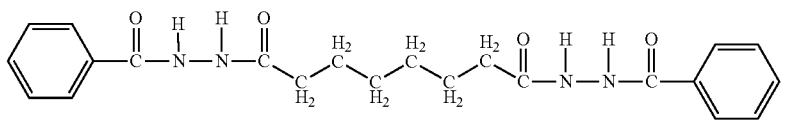

Compound No. 3

[Formula 5]

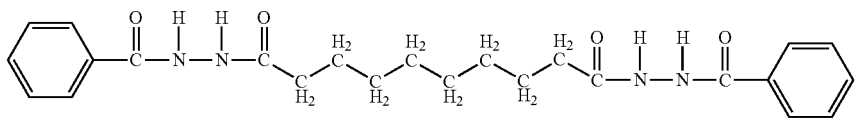

Compound No. 4

[Formula 6]

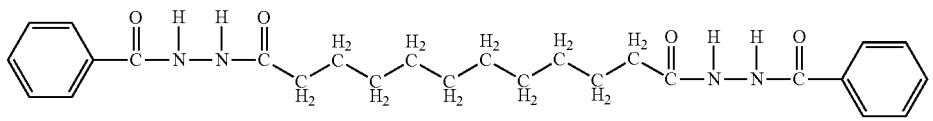

Compound No. 5

[Formula 7]

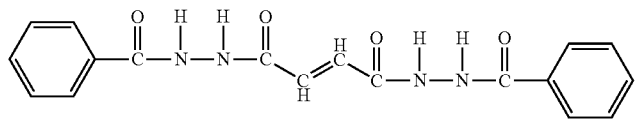

Compound No. 6

[Formula 8]

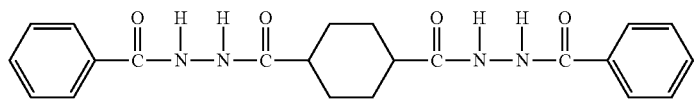

Compound No. 7

[Formula 9]

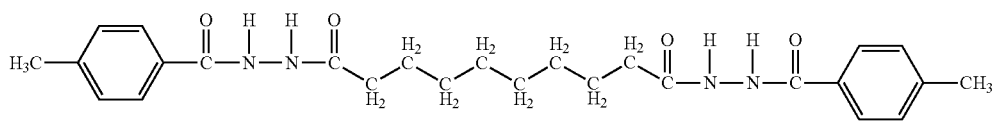

Compound No. 8

[Formula 10]

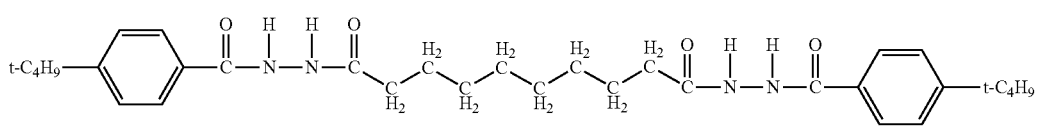

Compound No. 9

[Formula 11]

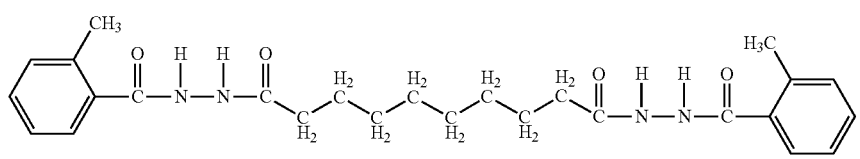

Compound No. 10

[Formula 12]

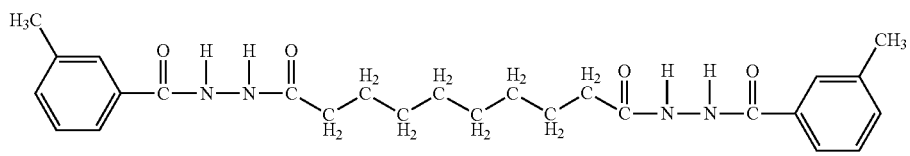

Compound No. 11

[Formula 13]

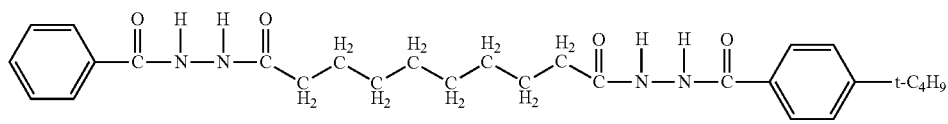

Compound No. 12

Synthetic methods of the above compounds are not particularly limited; they may be synthesized by a method in which one mole of hydrazine is reacted with one mole of an aroyl halide such as benzoyl chloride, followed by reaction with a phenyl ester of dibasic acid, such as diphenyl adipate, accompanying with release of phenol.

In the polylactic acid resin composition of the present invention, the compound represented by general formula (I) is blended in an amount of 0.01 to 10 parts by weight, preferably 0.05 to 5 parts by weight, and more preferably 0.1 to 3 parts by weight with respect to 100 parts by weight of the polylactic acid. If the amount is less than 0.01 parts by weight, the addition is not sufficiently effective, whereas if the amount is over 10 parts by weight, the addition tends to cause adverse phenomena such as deposition on surfaces of the polylactic acid composition.

Preferably, in the polylactic acid resin composition of the present invention, hydrated magnesium silicate (talc) is further blended. The average particle diameter of the hydrated magnesium silicate (talc) is preferably 10 μm or less, and more preferably 1 to 5 μm. Use of hydrated magnesium silicate (talc) with an average particle diameter greater than 10 μm may be effective, but when the average particle diameter is 10 μm or less, the use thereof has a higher promoting effect on forming crystal nucleation and further improves heat resistance of the moldings.

The hydrated magnesium silicate (talc) is blended in an amount of preferably 0.01 to 40 parts by weight, and more preferably 0.01 to 30 parts by weight, with respect to 100 parts by weight of the polylactic acid. If the amount is less than 0.01 parts by weight, the addition is not so effective, whereas if the amount is over 40 parts by weight, the polylactic acid resin composition has not only an increased specific gravity but also risk of lowering impact resistance.

The polylactic acid resin composition of the present invention may be further blended, if needed, with conventionally known various additives such as plasticizers, antioxidants, heat stabilizers, light stabilizers, ultraviolet absorbers, pigments, colorants, various fillers, antistatic agents, metal soaps, waxes, releasing agents, fragrances, lubricants, fire retardants, foaming agents, bulking agents, antimicrobial agents, antifungal agents, and crystallization accelerators other than the compounds represented by general formula (I).

The antioxidants include phenol-type antioxidants, phosphorous-containing antioxidants, thioether-type antioxidants, and others. The phenol-type antioxidants include, for example, 2,6-di-tert-butyl-p-cresol, 2,6-diphenyl-4-octadecyloxyphenol, distearyl(3,5-di-tert-butyl-4-hydroxybenzyl) phosphonate, 1,6-hexamethylenebis [(3,5-di-tert-butyl-4-hydroxylphenyl)propionamide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl (3,5-di-tert-butyl-4-hydroxyphenyl) propionate, thiodiethylene glycol bis[(3,5-di-tert-butyl-4-hydroxyphenyl)propionate], 1,6-hexamethyenebis[(3,5-di-tert-butyl-4-hydroxy-phenyl)propionate], bis[3,3-bis(4-hydroxy-3-tert-butylphenyl)butyric acid]glycolate, bis[2-tert-butyl-4-methyl-6-(2-hydroxy-3-tert-butyl-5-methylbenzy)phenyl]terephthalate, 1,3,5-tris[(3,5-di-tert-butyl-4-hydroxypeenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5] undecane, triethylene glycol bis[(3-tert-butyl-4-hydroxy-5-methylphenyl)propionate], and others. These are used in an amount of 0.001 to 10 parts by weight, preferably 0.05 to 5 parts by weight, with respect to 100 parts by weight of the resin.

The phosphorous-containing antioxidants include, for example, trisnonylphenyl phosphite, tris[2-tert-butyl-4-(3-tert-butyl-4-hydroxy-5-methylphenylthio)-5-methylphenyl] phosphite, tridecyl phosphite, octyl diphenyl phosphite, di(decyl)monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl) pentaerythritol diphosphite, tetra (tridecyl)isopropylidenediphenol diphosphite, tetra(tridecyl) 4,4'-n-butylidenebis(2-tert-butyl-5-methylphenol)diphosphite, hexa(tridecyl)1,1,3-tris(2-methyl-4-hydroxy-5-tert-butylphenyl)butane triphosphite, tetrakis(2,4-di-tert-butylphenyl) biphenylene diphosphonate, 9,10-dihydro-9-oxa-10-phosphaphenanthrene-10-oxide, 2,2'-methyl-enebis (4,6-di-tert-butylphenyl) 2-ethylhexyl phosphite, 2,2'-methylenebis(4,6-di-tert-butylpheny) octadecyl phosphite, 2,2'-ethylidene-bis(4,6-di-tert-butylphenyl) fluoro-phosphite, tris(2-[(2,4,8,10-tetrakis-tert-butyldibenzo-[d,f][1,3, 2]-dioxaphosphepin-6-yl)oxy]-ethyl)amine, phosphite of 2-ethyl-2-butylpropylene glycol and 2,4,6-tri-tert-butyphenol, and others. These are added in an amount of 0.001 to 10 parts by weight, and more preferably 0.05 to 5 parts by weight, with respect to 100 parts by weight of the resin.

The thioether-type antioxidants include dialkyl thiodipropionates such as dilauryl thiodipropionate, dimyristyl thiodipropionate, and distearyl thiodipropionate; and β-alkylmercaptopropionates of polyol such as pentaerythritol tetra(β-dodecylmercaptopropionate). These are added in an amount of 0.001 to 10 parts by weight, and more preferably 0.05 to 5 parts by weight, with respect to 100 parts by weight of the resin.

The ultraviolet absorbers include, for example, 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone; 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxy-phenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. These are added in an amount of 0.001 to 10 parts by weight, and more preferably 0.05 to 5 parts by weight, with respect to 100 parts by weight of the resin.

The light stabilizers include, for example, hindered amines such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethy-4-piperidyl) sebacate, bis(1,2,2,6,6-pentamethyl-4-piperidyl) sebacate, tetrakis(2,2,6,6-tetramethyl-4-piperidyl) butanetetracarboxylate, tetrakis(1,2,2,6,6-pentamethyl-4-piperidyl)butanetetracarboxylate, bis(2,2,6,6-tetramethyl-4-piperidyl).di (tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazin-6-yl]-1,5,8,12-tetrazadodecane, 1,5,8,12-tetrakis[2,4-bis(N-butyl-N-(1,2,2, 6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-ylamino] undecane, and 1,6,11-tris[2,4-bis(N-butyl-N-(1,2,2,6,6-pentamethyl-4-piperidyl)amino)-s-triazin-6-ylamino] undecane. These are added in an amount of 0.001 to 10 parts by weight, and more preferably 0.05 to 5 parts by weight, with respect to 100 parts by weight of the resin.

The fire retardants include phosphates such as triphenyl phosphate, phenol/resorcinol/phosphorous oxychloride condensate, phenol/bisphenol A/phosphorous oxychloride condensate, and 2,6-xylenol/resorcinol/phosphorous oxychloride condensate; phosphoroamides such as aniline/phosphorous oxychloride condensates and phenol/xylylenediamine/phosphorous oxychloride condensate; phosphazene; halogen-containing fire retardants such as decabromodiphenyl ether and tetrabromobisphenol A; inorganic fire retardants such as aluminum hydroxide and magnesium hydroxide; nitrogen-containing fire retardants such as melaminecyanurate; phosphates of nitrogen-containing organic compound such as melamine phosphate, piperazine phosphate, melamine pyrophosphate, piperazine pyrophosphate, melamine polyphosphate, and piperazine polyphosphate; red phosphorous and surface-treated or encapsulated red phosphorous; ignition resistance aids such as antimony oxide and zinc borate; antidripping agents such as polytetrafluoroethylene and silicone resin; and others. These are added in an amount of 0.001 to 30 parts by weight, and more preferably 0.05 to 20 parts by weight, with respect to 100 parts by weight of the resin.

As the crystallization accelerators other than the compounds represented by general formula (I), there may be used publicly known compounds including aliphatic polyester oligomers such as lactic acid oligomers, and metal salts or ammonium salts of aryl phosphate, and others.

In the polylactic acid resin composition of the present invention, there is no particular limitation on the method for blending the polylactic acid with the compound represented by general formula (I) and the additives such as the hydrated magnesium silicate (talc). The blending may be performed by a conventional known method. For example, powder or pellets of polylactic acid may be mixed with the additives by dry blending, or a part of the additives may be pre-blended, followed by dry blending with the rest of components. After dry blending, the blend may be mixed using, for example, a mill roll, a Bambury mixer, a Supermixer, or others and kneaded with a single-screw or twin-screw extruder or others. Such mixing and kneading is generally performed at about 150 to about 300° C. There may also be used a method in which the additives are added in the polymerization process of polylactic acid, a method in which a master batch containing a high concentration of the additives is prepared and the master batch is added to polylactic acid, or others.

The polylactic acid resin composition of the present invention is mainly used as a molding material for various moldings similarly to general plastics.

Hereinafter, explanation will be given on the heat-resistant polylactic acid resin moldings of the present invention formed by molding the polylactic acid resin composition of the present invention and a preferred process for production thereof, the production process of the present invention.

The method to crystallize the polylactic acid resin composition includes, for example, a method in which the polylactic acid resin composition is molded to a molding and the molding is subsequently annealed at a temperature that allows the polylactic acid resin composition to crystallize. However, this method has a drawback that the molding is likely to deform in the course of crystallization during annealing. In order to circumvent this drawback, in the production process of the present invention, when the polylactic acid resin composition of the present invention is molded, the die temperature of a molding machine is set at a temperature that allows the polylactic acid resin composition of the present invention to crystallize, and it is kept at that temperature for a given period of time.

In the production process of the present invention, the polylactic acid resin composition of the present invention is melted, and the polylactic acid resin composition melted is filled in a die of a molding machine and kept therein for a determined period of time to be molded accompanied by crystallization, in which the die temperature has been set at a temperature that allows the polylactic acid resin composition to crystallize, that is, in the range not higher than the initiation temperature of crystallization determined with DSC and not lower than the glass transition temperature determined with DSC. Since the polylactic acid resin composition of the present invention contains the compound represented by general formula (I) as a nucleating agent as described above, in the production method of the present invention, the crystallization is completed in a die, providing polylactic resin moldings with excellent heat resistance and mechanical properties.

The appropriate die temperature varies with conditions such as the kind of polylactic acid or additives contained in the polylactic acid resin composition of the present invention used in molding; therefore, the crystallization temperatures (peak temperature of crystallization, initiation temperature of crystallization, and glass transition temperature) are determined in advance for the polylactic acid resin composition by DSC method and the die temperature is selected from the range not higher than the initiation temperature of crystallization and not lower than the glass transition temperature. In such temperature range, the polylactic acid resin composition of the present invention is readily crystallized, and furthermore, moldings with high dimensional accuracy can be obtained. Outside the above temperature range, crystallization becomes slow and the time to solidify during molding is prolonged, so that such condition is not suitable for practical use. The above crystallization temperature can be measured, for example, by DSC, in which 5 mg of a pellet sample is heated from ambient temperature to 210° C. at a rate of 50° C./min, kept at this temperature for 5 minutes, and then cooled with recording DSC response at a cooling rate of 20° C./min.

The polylactic acid resin composition of the present invention can be molded, similarly to general plastics, by extrusion molding, injection molding, blow molding, vacuum molding, compression molding or others and readily formed into various moldings such as sheets, rods, bottles, and containers.

The heat-resistant polylactic acid resin moldings of the present invention have excellent heat resistance. As an index of heat resistance, for example, the deflection temperature under low load according to JIS K-7207A may be used. The deflection temperature under low load is determined as follows: while a specimen is kept in a heating bath and given a flexural stress of 0.45 MPa, the temperature of heat-transmitting medium is increased at a given rate, and the temperature of heat-transmitting medium at which the deflection of specimen reaches a defined value is referred to as "deflection temperature under low load". The deflection temperature under low load of the moldings from the heat-resistant polylactic acid resin of the present invention can be properly adjusted according to use of the moldings by adjusting the amount of nucleating agent to be blended in the composition. For example, even if the moldings are used as a part for household appliances, which are not exposed often to a high temperature, the deflection temperature under low load is, for practical use, preferably 80° C. or higher, more preferably 90° C. or higher, and most preferably 100° C. or higher.

EXAMPLES

The present invention is further specifically described with Examples and Comparative Examples in the following, but the present invention is not limited by such Examples and others.

[Synthesis of Compound No. 3]

In 50 ml of dioxane were dissolved 27.2 g (0.2 mol) of benzoylhydrazide, 32.4 g (0.1 mol) of diphenyl octanedioate, and 14.2 g (0.2 mol) of pyridine, and the reaction was performed at 100° C. for 12 hours. To the reaction mixture, 500 ml of methanol was added at ambient temperature to precipitate white solids, which were collected by filtration. The yield was 30% and melting point was 225° C. as determined by DSC (under nitrogen atmosphere at a heating rate of 10° C./min). The IR spectrum of the compound obtained shows absorption peaks at 3220 cm$^{-1}$, 1600 cm$^{-1}$, and 1470 cm$^{-1}$.

[Synthesis of Compounds No. 4 and No. 5]

Compound No. 4 (yield: 31%, melting point: 208° C.) and compound No. 5 (yield: 33%, melting point: 185° C.) were obtained by the same procedure as that in synthesis of compound No. 3 except replacing 32.4 g of diphenyl octanedioate with 35.4 g of diphenyl decanedioate or 38.3 g of diphenyl dodecanedioate, respectively. The compounds obtained show IR spectra similar to that of compound No. 3.

Examples 1 to 4 and Comparative Examples 1 to 3

Blending components shown in Table 1 were mixed by dry blending, mixed in a molten state in a twin-screw kneading extruder at 210° C. for 4 minutes on average, and extruded through a head into a strand, which was chilled with water and cut to prepare pellets of the polylactic acid resin composition containing the nucleating agent.

The pellets obtained were subjected to measurement of the initiation temperature of crystallization (intersection of the tangent at the onset of peak in the DSC curve), the peak temperature of crystallization, the heat of crystallization, and the glass transition temperature. These temperatures were determined with 5 mg of a sample pellet using a DSC instrument (Perkin Elmer, Diamond DSC) with which the temperature was raised from ambient temperature to 210° C. at a rate of 50° C./min and kept at 210° C. for 5 minutes and subsequently the DSC curve was recorded while the temperature was lowered at a rate of 20° C./min. The results of measurements are shown in Table 1.

The pellets obtained were then dried under vacuum at 80° C. to absolute dryness and injection-molded using a die at 110° C. with a cooling time of 60 seconds in order to evaluate releasability and deformation of moldings released from the die in preparation of No. 1 A-type test specimen according to JIS K 7110. The evaluation was based on visual inspection of the specimen, on releasing from the die, for the presence or absence and, if present, the degree of adhesion to the die and of deformation. The specimen was rated at "Very good" if neither adhered to the die nor deformed, "Good" if exhibited slight suspicion of adhesion to the die but not deformed, "Intermediate" if exhibited suspicion of adhesion to the die and apparently deformed, or "Poor" if adhered to the die too strongly to be easily released and substantially deformed. The evaluation results are shown in Table 1.

Each of the blended components in Table 1 is given below.

Polylactic acid: Trade name "#5400" from Toyota Motor Corp., weight-average molecular weight, 160,000 (in terms of polystyrene, determined with gel permeation chromatography)

Talc: Trade name "MicroAce P-6" from Japan Talc Co., Ltd., fine talc powder

Comparative compound 1: Bis[3-(3,5-di-tert-butyl-4-hydroxyphenyl)propionyl]hydrazide Comparative compound 2: Trade name "Slipax H" from Nippon Kasei Chemical Co., Ltd., ethylenebis(12-hydroxystearoamide)

TABLE 1

| | | Example | | | | Comparative example | | |
|---|---|---|---|---|---|---|---|---|
| | | 1 | 2 | 3 | 4 | 1 | 2 | 3 |
| Composition (parts by weight) | Polylactic acid | 100 | 100 | 100 | 100 | 100 | 100 | 100 |
| | Compound No. 3 | 1 | | | | | | |
| | Compound No. 4 | | 1 | | | | | |
| | Compound No. 5 | | | 1 | 1 | | | |
| | Comparative compound 1 | | | | | | 1 | |
| | Comparative compound 2 | | | | | | | 1 |
| | Talc | | | | 1 | 1 | 1 | 1 |
| Initiation temperature of crystallization (° C.) | | 134.1 | 136.4 | 140.5 | 140.0 | 117.3 | 110.5 | 123.5 |
| Peak temperature of crystallization (° C.) | | 127.3 | 128.8 | 130.9 | 130.7 | 107.1 | 102.0 | 115.8 |
| Heat of crystallization (J/g) | | 40 | 44 | 45 | 45.8 | 26 | 26 | 36 |
| Glass transition temperature (° C.) | | 63.0 | 61.8 | 62.2 | 62.0 | 62.1 | 63.7 | 65.5 |
| Releasability and deformation | | Intermediate | Good | Good | Very good | Poor | Poor | Poor |

Table 1 clearly shows that as compared with the case without addition of any crystallization accelerator (Comparative example 1), the polylactic acid resin compositions of the present invention blended with a particular hydrazide compound have a higher peak temperature of crystallization, 120° C. or higher, and a larger heat of crystallization, 40 J/g or more, indicating a higher crystallization rate. When practically injection-molded, these resin compositions exhibited excellent moldability and the resultant molding was not deformed in release from a die (Examples 1 to 4). By contrast, with the polylactic acid resin composition blended with a hydrazide compound as a conventional catalyst deactivator and the polylactic acid resin composition blended with a known amide compound, although the results were better than Comparative example 1, the heat of crystallization was below 40 J/g and the moldability was poor (Comparative examples 2 and 3).

INDUSTRIAL APPLICABILITY

The present invention can provide a polylactic acid resin composition with high crystallization rate by blending the polylactic acid with a particular hydrazide compound as a nucleating agent. The polylactic acid resin composition can be formed with good moldability into heat-resistant polylactic acid resin moldings with excellent flexural strength and impact strength. The present invention also provides a simple and highly efficient process for producing heat-resistant polylactic acid resin moldings by crystallizing the above polylactic acid resin composition in a die.

The invention claimed is:

1. A polylactic acid resin composition, wherein polylactic acid is blended with a dibasic acid bis(benzoylhydrazide) represented by general formula (I) below:

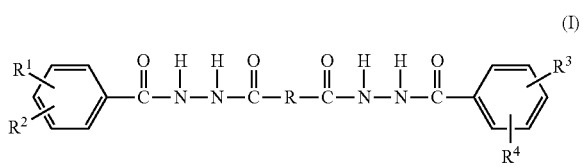

(I)

wherein,
R represents a alkylene, alkenylene, cycloalkylene, alkylene having an ether bond, or alkylene interrupted with a cycloalkylene, said R groups each having 1 to 12 carbon atoms; and
$R^1$, $R^2$, $R^3$, and $R^4$ each represent a hydrogen atom, halogen atom, alkyl, cycloalkyl, aryl, aralkyl, or alkylaryl, said R groups each having 1 to 12 carbon atoms, or $R^1$ and $R^2$ and/or $R^3$ and $R^4$ bond to each other to form a five- to eight-membered ring.

2. The polylactic acid resin composition according to claim 1, wherein 100 parts by weight of polylactic acid are blended with 0.01 to 10 parts by weight of the dibasic acid bis(benzoylhydrazide) represented by general formula (I).

3. The polylactic acid resin composition according to claim 1, wherein R in general formula (I) is a alkylene having 4 to 10 carbon atoms.

4. The polylactic acid resin composition according to claim 1, wherein each of $R^1$, $R^2$, $R^3$, and $R^4$ in general formula (I) is a hydrogen atom.

5. The polylactic acid resin composition according to claim 1, wherein R in general formula (I) is a alkylene having 6 to 10 carbon atoms and each of $R^1$, $R^2$, $R^3$, and $R^4$ in general formula (I) is a hydrogen atom.

6. The polylactic acid resin composition according to claim 1, wherein 0.01 to 40 parts by weight of hydrated magnesium silicate (talc) is blended.

7. The polylactic acid resin composition according to claim 6, wherein the average particle diameter of said hydrated magnesium silicate (talc) is 10 μm or less.

8. A polylactic acid resin molding formed by molding the polylactic acid resin composition described in claim 1.

9. A process for producing heat-resistant polylactic acid resin moldings, wherein after the polylactic acid resin composition described in claim 1 is melted, said polylactic acid resin composition melted is filled in a die of a molding machine is and molded accompanied with crystallization, in which the temperature of the die has been set in a range not higher than the initiation temperature of crystallization and not lower than the glass transition temperature, the initiation temperature of crystallization and the glass transition temperature being determined with a differential scanning calorimeter (DSC).

10. The polylactic acid resin composition according to claim 2, wherein R in general formula (I) is a alkylene having 4 to 10 carbon atoms.

11. The polylactic acid resin composition according to claim 2, wherein each of $R^1$, $R^2$, $R^3$, and $R^4$ in general formula (I) is a hydrogen atom.

12. The polylactic acid resin composition according to claim 3, wherein each of $R^1$, $R^2$, $R^3$, and $R^4$ in general formula (I) is a hydrogen atom.

13. The polylactic acid resin composition according to claim 2, wherein R in general formula (I) is a alkylene having 6 to 10 carbon atoms and each of $R^1$, $R^2$, $R^3$, and $R^4$ in general formula (I) is a hydrogen atom.

14. The polylactic acid resin composition according to claim 2, wherein 0.01 to 40 parts by weight of hydrated magnesium silicate (talc) is blended.

15. The polylactic acid resin composition according to claim 3, wherein 0.01 to 40 parts by weight of hydrated magnesium silicate (talc) is blended.

16. The polylactic acid resin composition according to claim 4, wherein 0.01 to 40 parts by weight of hydrated magnesium silicate (talc) is blended.

17. The polylactic acid resin composition according to claim 5, wherein 0.01 to 40 parts by weight of hydrated magnesium silicate (talc) is blended.

* * * * *